(No Model.) 2 Sheets—Sheet 1.

H. P. DOOLEY.
COTTON PICKER.

No. 245,459. Patented Aug. 9, 1881.

Witnesses:
Am Long.
A. M. Tanner

Hammond P. Dooley, Inventor.
By Paine, Grafton & Ladd,
Attorneys.

(No Model.) 2 Sheets—Sheet 2.

H. P. DOOLEY.
COTTON PICKER.

No. 245,459. Patented Aug. 9, 1881.

Witnesses: Hammond P. Dooley, Inventor.
A. M. Long
A. M. Tanner

By Paine Grafton & Ladd,
Attorneys.

UNITED STATES PATENT OFFICE.

HAMMOND P. DOOLEY, OF FORREST CITY, ARKANSAS.

COTTON-PICKER.

SPECIFICATION forming part of Letters Patent No. 245,459, dated August 9, 1881.

Application filed June 16, 1881. (No model.)

*To all whom it may concern:*

Be it known that I, HAMMOND P. DOOLEY, a citizen of the United States, residing at Forrest City, in the county of St. Francis and State of Arkansas, have invented certain new and useful Improvements in Cotton-Pickers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to that class of cotton-pickers in which a series of revolving bearded spindles are successively brought down among the cotton-plants for picking the cotton therefrom, a clearing or stripping device being located in proper relation to the picking-spindles, and a receiver or box for delivering the cotton into the latter.

The invention consists, essentially, of bearded picking-spindles placed in circumferential rows or sets on a horizontal drum or casing, which is secured to rotating ground or traction wheels traveling at the sides of a row of cotton-plants. The axle of the ground-wheels is stationary, and carries a series of fixed toothed rims, which serve to impart a rotary movement to the picking-spindles, through the medium of pinions or spur-wheels on the inner ends of said spindles engaging with said toothed rims. The latter are mutilated or provided with a plain or depressed portion for causing the picking-spindles to discontinue their rotary movement after they have left the cotton-plants, at which time the spindles are presented to a stripping or clearing shaft, which removes the cotton from the spindles and delivers it into a receiver or box located in advance of the picking devices.

Figure 1:
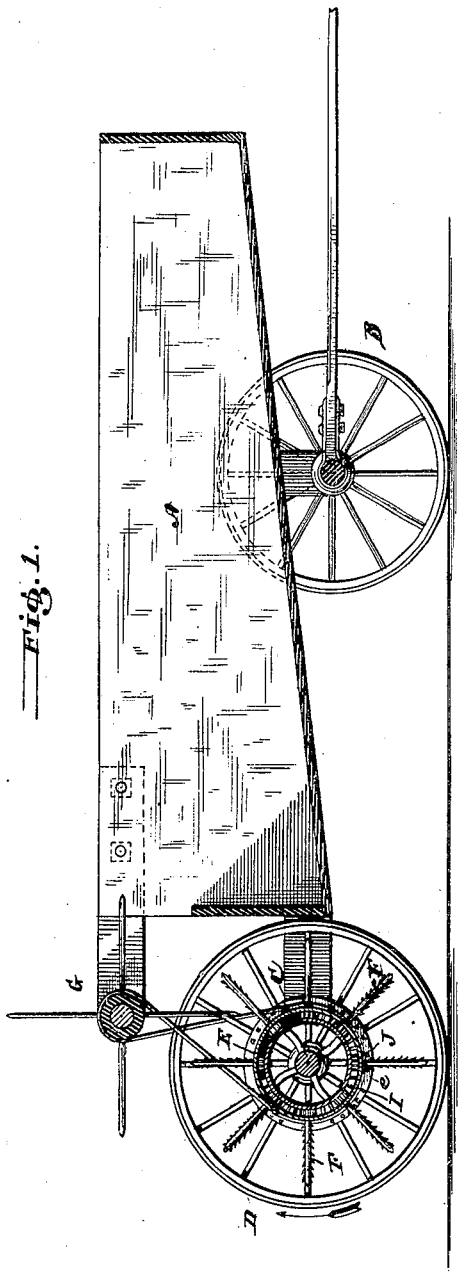
Figure 3:
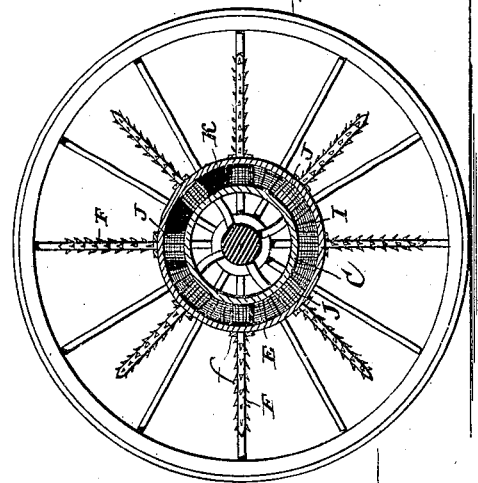
Figure 2:
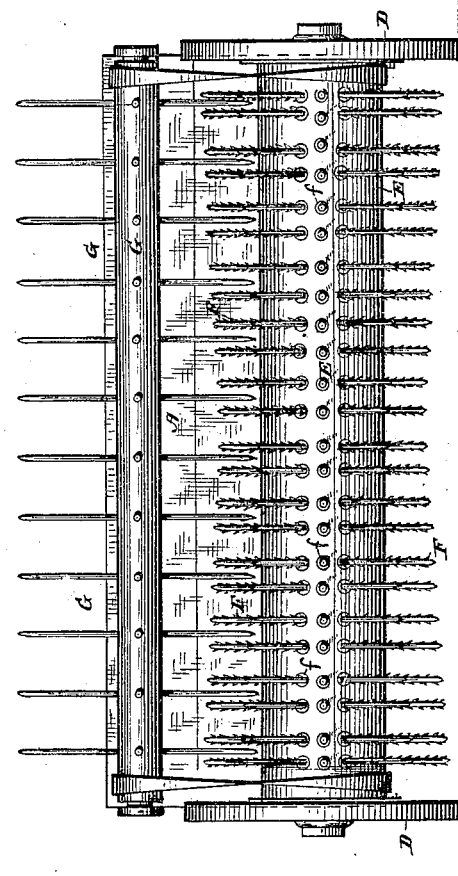

In the drawings, Figure 1 is a longitudinal sectional view of a cotton-picker constructed according to my invention. Fig. 2 is a rear elevation thereof. Fig. 3 is a detail sectional view, showing the flanged drum, traction-wheel, and the position of one of the picking-spindles when its movement is arrested by the depressed portion of the toothed rim of the stationary shaft.

The letter A designates a receiver or box, which is mounted on a pair of transporting-wheels, B, constituting, with its axle and a suitable reach and tongue, the running and draft gear of the machine. The bottom of the box or receiver is made smooth, and the picking devices, located at the rear of the same, are so arranged that the cotton is properly delivered or thrown into the receiver. An axle or cross-bar, C, located in rear of said receiver, is secured to suitable supports or bearings, and has end spindles or arms, upon which are loosely fitted ground or traction wheels D. The stationary axle C is surrounded by a rotating drum or shell, E, which has perforated end flanges, e, for bolting or otherwise securing it to the spokes of the ground-wheels D.

A series of bearded picking-spindles, F, projecting from the drum E, are arranged in circumferential and parallel rows thereon, and are so contrived and combined with actuating devices that they will enter the cotton-plants horizontally, and assume vertical positions as the drum is rotated or the machine is advanced, for properly picking or stripping the cotton from the plants or stalks. A further progressive movement of the machine will cause the picking-spindles to leave the cotton-plants and bring said spindles into position to be acted upon by a revolving stripping or relieving device, G. The latter consists of a revolving shaft, which is driven through the medium of suitable belt or spur gearing from the rotating drum or one of the ground-wheels D, and carries a series of fingers or teeth that serve to strip the cotton from the bearded spindles. The stripping device is so arranged in relation to the rear end of the receiver or box that the cotton is properly delivered into the latter.

The drum E, carrying the picking-spindles, serves to convey the latter through or among the cotton plants or stalks, as has already been stated, the picking-spindles being of different lengths, so as to adapt themselves to the height of the plants. An independent revolving movement is imparted to the spindles during the performance of the picking operation through the medium of a series of toothed rims, I, which are preferably constructed with radial arms and a hub portion keyed or otherwise secured to the stationary axle C. These toothed rims are so constructed and arranged that each rim serves to set in motion two adjoining circumferential rows or sets of picking-spindles. In order to enable this to be done, each rim has its teeth located or formed at both sides of its periphery, and a pinion or spur wheel, J, applied to the inner end of each spindle meshes into the teeth of said rim. The teeth do not extend around the entire circumference of the rim, but a portion thereof, generally one-quarter, is left plain, so as to form a depressed portion, K, into which the pinions pass for discontinuing the revolution of the picking-spindles at the proper period. This is when the spindles have passed in an upward direction through the cotton-plants and are in position to be acted upon by the stripping device.

It will be manifest that the independent revolving movement of the picking-spindles is arrested so long as the pinions are traveling in the segment of a circle corresponding to the plain portion of the toothed rim. During this entire period the drum is rotating, causing different sets of spindles to be successively brought into action for picking the cotton from the plants, while the operation of stripping the cotton is performed upon such spindles as have passed out of the cotton-plants and are in position to have their pinions travel in or along the plain or depressed portions of the toothed rims.

The inner ends of the picking-spindles are preferably made with a screw-thread for receiving the screw-threaded bore of the pinion, and a shoulder or collar, f, formed on the spindle outside the drum E, bears upon the same, so as to properly retain the spindle in position or prevent the endwise movement thereof.

The picking-spindles are preferably made of metal, having the beards or barbs formed thereon by properly nicking the metal. I may, however, resort to spindles covered with card-teeth or clothing for performing the picking operation, or any other device which will seize the mature cotton and not tear or open the green bolls.

By locating the picking devices in the manner shown no special devices are required for pressing the cotton-stalks forward for proper presentation to the picking devices. The smooth-bottomed receiver or box is all that is needed for depressing the stalks.

Having thus described my invention, what I claim as new, and desire to secure by Letters Patent, is—

1. In a cotton-picker, the combination of a horizontal rotating drum or shell, a series of picking-spindles carried thereby, and mechanism, substantially as described, for imparting a revolving movement to the picking-spindles at one period of the rotation of the drum, and arresting the revolution of said spindles at another period of the rotation of said drum, with a suitable receiver, and a device for stripping the cotton from the spindles, substantially as herein set forth.

2. In a cotton-picker, the combination of a stationary shaft, a series of toothed rims mounted thereon, having plain or mutilated portions, a rotating drum, ground or traction wheels on the ends thereof, and a series of picking-spindles carried by the drum and provided with pinions or spur-wheels on their inner ends, with a receiver or box, and a stripping device, substantially as and for the purpose set forth.

In testimony whereof I affix my signature in presence of two witnesses.

HAMMOND PORTER DOOLEY.

Witnesses:
J. P. THOMASON,
J. M. PARROTT.